United States Patent
Oshita et al.

(10) Patent No.: US 9,122,018 B2
(45) Date of Patent: Sep. 1, 2015

(54) CASSETTE FOR OPTICAL FIBER AMPLIFIER, OPTICAL FIBER AMPLIFIER AND LIGHT SOURCE DEVICE

(75) Inventors: Yoshinori Oshita, Yoshikawa (JP); Yasutoshi Takada, Kawasaki (JP)

(73) Assignee: NIKON CORPORATION, Tokyo (JP)

(*) Notice: Subject to any disclaimer, the term of this patent is extended or adjusted under 35 U.S.C. 154(b) by 986 days.

(21) Appl. No.: 12/318,995

(22) Filed: Jan. 14, 2009

(65) Prior Publication Data
US 2009/0147351 A1   Jun. 11, 2009

Related U.S. Application Data

(63) Continuation of application No. PCT/JP2007/063381, filed on Jul. 4, 2007.

(30) Foreign Application Priority Data

Jul. 19, 2006   (JP) ................................. 2006-197137

(51) Int. Cl.
*G02B 6/24* (2006.01)
*H04B 10/17* (2006.01)
(Continued)

(52) U.S. Cl.
CPC .............. *G02B 6/3636* (2013.01); *H01S 3/042* (2013.01); *H01S 3/06704* (2013.01); *G02B 6/42* (2013.01); *G02B 6/4453* (2013.01); *H01S 3/06754* (2013.01)

(58) Field of Classification Search
USPC .......................... 359/341.1, 341.3; 385/27, 39
See application file for complete search history.

(56) References Cited

U.S. PATENT DOCUMENTS 5,128,801 A * 7/1992 Jansen et al. .................. 359/343
5,555,127 A * 9/1996 Abdelkader et al. ....... 359/341.1
(Continued)

FOREIGN PATENT DOCUMENTS

CA   2 292 143 A1   6/2000
EP   0 795 767 A2   9/1997
(Continued)

OTHER PUBLICATIONS

English Translation of Japanese Office Action in Application No. 2008-525828 mailed May 29, 2012.
(Continued)

*Primary Examiner* — Eric Bolda
(74) *Attorney, Agent, or Firm* — Oliff PLC

(57) ABSTRACT

Grooves (22, 23) for containing an optical fiber and five recesses (24) for containing the optical components for an optical fiber amplifier are provided in the surface of a substrate (21). An optical fiber fitted in a groove (23*a*) for containing the optical fiber and introduced to the substrate (21) is passed through a groove (22*a*) for containing the optical fiber and fitted in a groove (22) for containing the optical fiber, thence passed through a groove (22*b*) for containing the optical fiber and introduced to the outside of the substrate (21). In the recess (24) for containing the optical component for an optical fiber amplifier, an optical component such as a photocoupler is fitted and coupled with the optical fiber. Light such as pumping light is passed through an optical fiber contained in the groove (23) for containing the optical fiber and introduced to an optical component such as a photocoupler. When the optical fiber and the optical component for an optical fiber amplifier are contained in such a recess of the cassette, they can be contained orderly.

14 Claims, 1 Drawing Sheet

(51) Int. Cl.
*H01S 3/042* (2006.01)
*H01S 3/067* (2006.01)
*G02B 6/36* (2006.01)
G02B 6/44 (2006.01)
G02B 6/42 (2006.01)

(56) References Cited

U.S. PATENT DOCUMENTS

| | | | |
|---|---|---|---|
| 5,579,154 A * | 11/1996 | Mueller-Fiedler et al. | 359/341.1 |
| 5,703,990 A | 12/1997 | Robertson et al. | |
| 5,726,796 A | 3/1998 | Regener et al. | |
| 5,778,132 A * | 7/1998 | Csipkes et al. | 385/135 |
| 5,867,305 A * | 2/1999 | Waarts et al. | 359/337.12 |
| 6,151,338 A | 11/2000 | Grubb et al. | |
| 6,381,394 B1 | 4/2002 | Cabrera et al. | |
| 6,594,420 B1 * | 7/2003 | Lange et al. | 385/36 |
| 6,611,372 B1 * | 8/2003 | Peyghambarian et al. | 359/341.1 |
| 6,621,623 B1 * | 9/2003 | Okuno | 359/341.1 |
| 7,321,708 B2 * | 1/2008 | Jenkins et al. | 385/52 |
| 7,449,784 B2 * | 11/2008 | Sherrer et al. | 257/774 |
| 2002/0181081 A1 * | 12/2002 | Myers et al. | 359/341.1 |
| 2003/0012505 A1 | 1/2003 | Kondo et al. | |
| 2003/0081914 A1 * | 5/2003 | Steinberg et al. | 385/94 |
| 2003/0133686 A1 | 7/2003 | Delrosso et al. | |
| 2004/0264866 A1 * | 12/2004 | Sherrer et al. | 385/49 |
| 2005/0123246 A1 * | 6/2005 | Morse et al. | 385/53 |
| 2007/0153364 A1 * | 7/2007 | Chi et al. | 359/341.1 |
| 2007/0164419 A1 * | 7/2007 | Sherrer et al. | 257/689 |
| 2009/0060444 A1 * | 3/2009 | Muendel | 385/137 |

FOREIGN PATENT DOCUMENTS

| | | | |
|---|---|---|---|
| EP | 1 011 178 A1 | 6/2000 | |
| EP | 1 137 131 A1 | 9/2001 | |
| JP | 03-013831 | 1/1991 | |
| JP | A-4-11794 | 1/1992 | |
| JP | 09-107142 | 4/1997 | |
| JP | A-10-3009 | 1/1998 | |
| JP | A-2000-183429 | 6/2000 | |
| JP | A-2001-337356 | 12/2001 | |
| JP | A-2001-353176 | 12/2001 | |
| JP | A-2003-133620 | 5/2003 | |
| JP | A-2003-202430 | 7/2003 | |
| TW | B-440731 | 6/2001 | |
| WO | WO 2005/055377 A1 | 6/2005 | |
| WO | WO 2005055377 A1 * | 6/2005 | H01S 3/067 |

OTHER PUBLICATIONS

English Translation of Japanese Office Action in Application No. 2008-525828 mailed Oct. 2, 2012.

English Translation of Japanese Office Action in Application No. 2008-525828 mailed Mar. 5, 2013.

Japanese Office Action in Application No. 2008-525828 mailed May 29, 2012.

Japanese Office Action in Application No. 2008-525828 mailed Oct. 2, 2012.

Japanese Office Action in Application No. 2008-525828 mailed Mar. 5, 2013.

Mar. 22, 2013 Office Action issued in Taiwanese Patent Application No. 096126278 (with English Translation).

Mar. 22, 2013 Office Action issued in Taiwanese Patent Application No. 096126278.

Jul. 31, 2007 International Search Report issued in International Application No. PCT/JP2007/063381.

Jul. 31, 2007 Written Opinion issued in International Application No. PCT/JP2007/063381.

* cited by examiner

CASSETTE FOR OPTICAL FIBER AMPLIFIER, OPTICAL FIBER AMPLIFIER AND LIGHT SOURCE DEVICE

TECHNICAL FIELD

The present invention relates to a cassette for an optical fiber amplifier, an optical fiber amplifier, and a light source device.

BACKGROUND ART

In recent years, a laser beam is used in various applications, for example, it is used to cut or machine metals, used as a light source of a photolithography device in a semiconductor manufacturing apparatus, used in various measuring instruments, or used in operations and treatment devices for surgery, opthalmology, dental surgery and the like.

When a solid-state laser (cited as a concept including semi-conductor laser (or diode laser) in the present description) is used as such a laser light source, the wavelength of a laser beam emitted from the solid-state laser is in a region between the visible light region and the infrared region, and the method of directly generating ultraviolet light has not been established yet. The wavelength is too long to be used in, for example, an inspection apparatus. Because of this, the method of using light having a long wavelength emitted from such a solid-state laser by converting it into a deep ultraviolet light having a short wavelength (for example, the eighth harmonic wavelength of which is 193 nm) using a nonlinear optical crystal has been developed and disclosed in, for example, JP2001-353176 (patent document 1). As a nonlinear optical crystal used for such a purpose, BBO crystal, LBO crystal, CLBO crystal, and the like are known.

In such a laser light source, it is general that, for example, a laser beam generated from DFB-LD is amplified using a plurality of optical fiber amplifiers (FDFA) and then it is converted into deep ultraviolet light through the wavelength conversion optical system as described above. The optical fiber amplifier may include only one stage. However, in most cases the gain is increased by connecting a plurality of stages in series.

Such an optical fiber amplifier is configured by optical fibers as long as several meters and optical fiber components (optical component for an optical fiber amplifier). Because the optical fiber is long and the number of optical fiber components is large, when containing these fibers in a fixture, the optical fibers will get tangled in a complex manner and its task will be very complicated. In addition, in case an anomaly occurs in an optical fiber or an optical fiber component, it is difficult to locate the anomalous region, and therefore, the component cannot be replaced with another at once.

Further, in a state where the optical fibers are just wound and fixed, the state of the optical fibers may change due to vibrations during transportation.

On the other hand, in order to raise the output of an optical fiber amplifier, it is necessary to increase the pump power. However, accompanying an increase in pump power, heat is generated from the EDFA fiber. This diffused heat will cause an increase in an ambient temperature or a substrate temperature and affects adversely the optical fiber amplifier.

Consequently, if the optical fibers are contained in a state where the optical fibers get tangled in a complex manner and heat is generated from the EDFA fiber, the optical fiber amplifier is put in a very unstable state and it becomes difficult to stably oscillate a laser beam.

The present invention has been developed with such circumstances being taken into consideration and an object thereof is to provide a cassette for an optical fiber amplifier capable of containing an optical fiber amplifier orderly, an optical fiber amplifier using the same, and a light source device using the optical fiber amplifier.

DISCLOSURE OF THE INVENTION

A first means for achieving the above-mentioned object is a cassette for an optical fiber amplifier for containing an optical fiber amplifier, wherein in a surface of a substrate, a groove with a width corresponding to the width of single optical fiber and a recess in which an optical component for the optical fiber amplifier is disposed are formed.

By the use of the present means, it is possible to contain the optical fibers of an optical fiber amplifier and the optical components for the optical fiber amplifier orderly in the grooves and the recesses, respectively, and therefore, a state where the optical fibers get tangled in a complex manner can be avoided.

A second means for achieving the above-mentioned object is the first means, wherein the substrate is a cooling substrate.

The cooling substrate refers, for example, to a hollow substrate through which air, water or a refrigerant passes for cooling, or a substrate in which cooling is conducted by a Peltier element or the like. In the present means, the recesses that contain the optical fibers and the optical components for the optical fiber amplifier are formed in the surface of the cooling substrate, and therefore, heat generated in the optical fiber amplifier can be absorbed by the substrate.

A third means for achieving the above-mentioned object is the first means, wherein the substrate comes into contact with a cooling substrate and is cooled via the cooling substrate.

In the present means also, heat generated in the optical fiber amplifier can be absorbed by the substrate.

A fourth means for achieving the above-mentioned object is a cassette for an optical fiber amplifier, wherein a groove that contains the optical fiber constituting the optical fiber amplifier is formed in the surface of the substrate and the groove has twofold or multifold spiral configuration formed in such a way that the optical fiber amplifier does not come into contact with one another.

A fifth means for achieving the above-mentioned object is the fourth means, wherein a recess for disposing an optical component for the optical fiber amplifier is formed in a part of the spiral configuration.

A sixth means for achieving the above-mentioned object is an optical fiber amplifier, wherein the optical fiber is contained in the grooves of the cassette for the optical fiber amplifier of any of the first to third means and an optical component for the optical fiber amplifier is contained in the recess of the cassette.

In the present means, the optical fibers of the optical fiber amplifier and the optical components for the optical fiber amplifier can be contained in the grooves and the recesses orderly, respectively, and therefore, the state where the optical fibers get tangled in a complex manner can be avoided.

A seventh means for achieving the above-mentioned object is an optical fiber amplifier configured by sequentially stacking a plurality of the optical fiber amplifiers, which is the sixth means, in such a way that one optical fiber amplifier is put on a surface of another substrate.

An eighth means for achieving the above-mentioned object is an optical fiber amplifier, wherein only a single optical fiber forming the optical fiber amplifier is contained in the groove of the cassette for the optical fiber amplifier, which is the fourth means.

A ninth means for achieving the above-mentioned object is a light source device comprising a light source, the optical fiber amplifier of any of the sixth to eighth means that amplifies light irradiated from the light source, and a wavelength conversion section that converts a wavelength of the amplified light into a predetermined wavelength.

According to the present invention, it is possible to provide a cassette for an optical fiber amplifier capable of containing an optical fiber amplifier orderly, an optical fiber amplifier using the same, and a light source device using the optical fiber amplifier.

Figure 1:
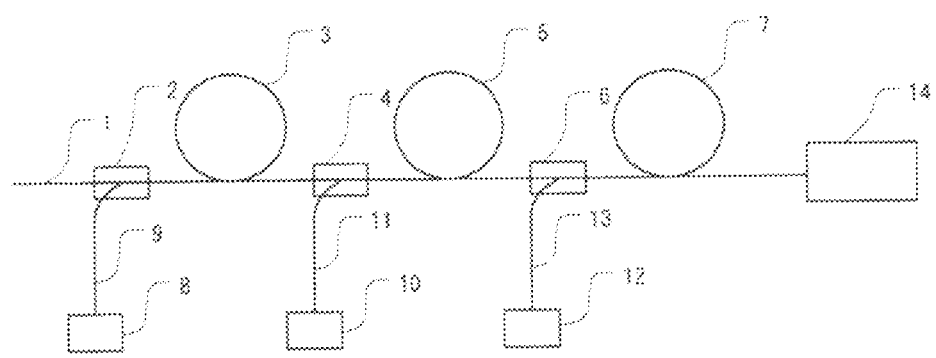
FIG. 1 is a diagram showing a configuration of an optical fiber amplification section according to an embodiment of the present invention.

EXPLANATIONS OF LETTERS OR NUMERALS 1 optical fiber
3, 5, 7 amplifying optical fiber
2, 4, 6 optical coupler (WDM)
9, 11, 13 optical fiber for excited light
8, 10, 12 light source for excitation
14 wavelength conversion section
21 substrate
22 groove for containing an optical fiber
22a groove for containing an optical fiber
22b groove for containing an optical fiber
23 groove for containing an optical fiber
23a groove for containing an optical fiber
24 recess for containing an optical component for an optical fiber amplifier

BEST MODES FOR CARRYING OUT THE INVENTION

An example of an embodiment of the present invention will be described below with reference to drawings. FIG. 1 is a diagram showing a configuration of an optical fiber amplification section according to an embodiment of the present invention. The optical fiber amplification section comprises a first amplifying optical fiber 3, a second amplifying optical fiber 5, a third amplifying optical fiber 7, optical couplers (WDM) 2, 4, 6, light sources for excitation 8, 10, 12, and optical fibers for excited light 9, 11, 13.

An optical fiber 1 that guides a laser beam emitted from a seed light source, not shown, to the optical fiber amplification section, the first amplifying optical fiber 3, and the first optical fiber for excited light 9 are coupled via the WDM 2. Similarly, the first amplifying optical fiber 3, the second amplifying optical fiber 5, and the second optical fiber for excited light 11 are coupled via the WDM 4, and the second amplifying optical fiber 5, the third amplifying optical fiber 7, and the third optical fiber for excited light 13 are coupled via the WDM 6.

Excited light from each light source for excitation is introduced into the amplifying optical fiber through each optical fiber for excited light and each WDM. The laser beam emitted from the seed light source, not shown, is amplified in the optical fiber amplification section and the amplified laser beam is converted into ultraviolet light in a wavelength conversion section 14.

Figure 2:
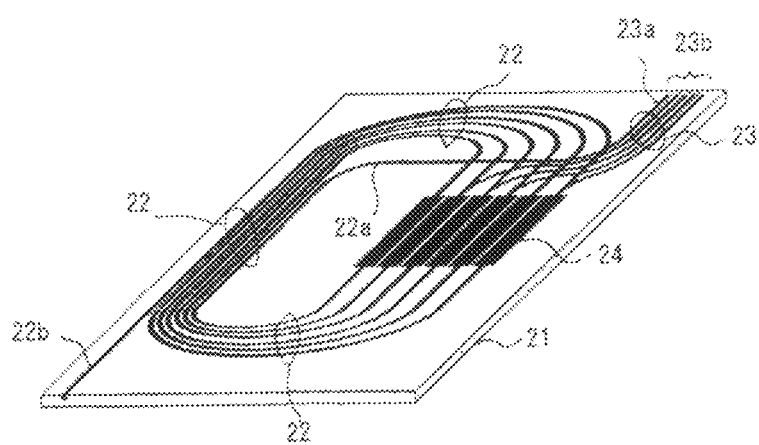
FIG. 2 is a diagram showing the outline of a cassette for an optical fiber amplifier, which is an example of an embodiment of the present invention.

A configuration of a cassette that contains the optical fiber amplification section will be described. FIG. 2 is a diagram showing a configuration of the cassette for an optical fiber amplifier in the present embodiment. In the surface of a substrate 21, grooves 22, 23 for containing an optical fiber with a width for which single optical fiber can be fitted in (contained) (one optical fiber is fitted in one groove), and five recesses 24 for containing optical components for the optical fiber amplifier (hereinafter, referred only to as "recesses for containing optical components") are provided.

Grooves 23 for containing optical fibers include a groove 23a for containing an optical fiber and grooves 23b for containing optical fibers, and after the groove 23a for containing an optical fiber intersects with the groove 22 for containing an optical fiber, it becomes a part 22a of the groove 22 for containing an optical fiber and after the grooves 23b for containing optical fibers intersect with the groove 22 for containing an optical fiber, they connect to the recesses 24 for containing optical components. A depth of the groove 22 for containing an optical fiber is 2 mm and the depth of the grooves 23b for containing an optical fiber is 1 mm. A depth of the groove 23a for containing an optical fiber is 1 mm. However, after it becomes the part 22a of the groove 22 for containing an optical fiber, its depth is 2 mm.

In the groove 23a for containing an optical fiber and the groove 22 for containing an optical fiber (including the grooves 22a, 22b for containing an optical fiber), the optical fiber 1, the first amplifying optical fiber 3, the second amplifying optical fiber 5, and the third amplifying optical fiber 7 connected into one unit via the WDMs 2, 4, 6 are fitted. A diameter of the wind increases in the order of the first amplifying optical fiber 3, the second amplifying optical fiber 5, and the third amplifying optical fiber 7. Thus, as power of the laser beam that passes through an amplifying optical fiber increases, a diameter of the wind of the amplifying optical fiber increases.

In other words, the optical fibers 1, 3, 5, 7 fitted in the groove 23a for containing an optical fiber are intersecting with a part of the groove 22 for containing an optical fiber, fitted in the groove 22a for containing an optical fiber and in the groove 22 for containing an optical fiber, and then introduced to the outside of the substrate 21 through the groove 22b for containing an optical fiber.

In the grooves 23b for containing optical fibers, the first optical fiber for excited light 9, the second optical fiber for excited light 11, and the third optical fiber for excited light 13 are fitted, respectively.

In the recesses 24 for containing optical components, optical components, such as WDMs, are fitted, and then the optical components are coupled to the optical fibers for excited light 9, 11, 13 and the amplifying optical fibers 3, 5, 7, respectively.

In the drawing, the groove 22 for containing an optical fiber and the grooves 23 for containing optical fibers intersect with each other. However, the depth of the former is 2 mm, while the depth of the latter is 1 mm, and the diameter of the various optical fibers is 0.5 mm. Accordingly, it is unlikely that the optical fibers come into contact with each other at the intersections.

By containing the optical fibers and the optical components for an optical fiber amplifier in the grooves and the recesses formed on the substrate, respectively, they can be contained orderly. In the drawing, the recesses 24 for containing optical components are provided together. However, the recesses 24 may be provided at arbitrary positions in the substrate 1 in accordance with the design specifications of the optical fiber amplifier to contain the optical components.

Although the description is given using an example in which a series of the three amplifying optical fibers 3, 5, 7 is contained in one cassette, the invention is not limited to this configuration, and it is also possible to contain each of the amplifying optical fibers in an individual cassette.

The contained various optical fibers and optical components may be fixed with a tape or the like, or fixed with a material having adhesion, such as an adhesive, a cement, and a solder. It is also possible to overlap another substrate over the surface side and fix the optical fibers and components by sandwiching them between the substrates.

Alternatively, it is also possible to use the substrate 21 as a cooling substrate and provide recesses for containing an optical fiber and optical component in its surface. The cooling substrate refers, for example to a hollow substrate through which air, water, or a refrigerant passes for cooling, or a substrate in which cooling is conducted by a Peltier element or the like. With such a structure, heat generated in the optical fiber amplifier can be absorbed by the substrate because the recesses for containing optical fibers and optical components for an optical fiber amplifier are formed in the surface of the cooling substrate. Alternatively, it may also be possible to overlap and fix a cooling substrate on the cassette to cool the cassette.

By the use of such a cassette, it is possible to orderly dispose the optical fibers and the optical components and thus the manufacture of the optical fiber amplifier is facilitated. Further, even if trouble occurs in an optical fiber or an optical component, the region can be located easily and the replacement can also be done easily. Furthermore, it is made possible to dispose optical fiber amplifiers by which heat is generated at positions separate from other optical fibers and thus an influence of the generated heat on other fibers can be suppressed as much as possible. Still furthermore, by putting the optical fibers and the optical components into grooves and fixing them, they will be hardly affected by vibrations during transportation. In addition, by cooling the cassette itself, it is made possible to suppress the influence of generated heat itself.

When there is a plurality of optical fiber amplification sections (configured by three amplifying optical fibers), a plurality of cassettes for an optical fiber amplifier shown in FIG. 2 is prepared and a configuration is designed as below. Each optical fiber amplification section is contained in each cassette, and then, the plurality of cassettes is stacked in such a way that a cassette is overlapped over a surface of another cassette substrate. A configuration in which cassettes for containing the seed light source and the wavelength conversion section are also stacked in such a way that a cassette is overlapped over a surface of another cassette substrate may be adopted.

The invention claimed is:

1. A cassette for an optical fiber amplifier, comprising:
a substrate with a surface;
a groove formed in the surface and having a width corresponding to a width of a single optical fiber and for containing amplifying optical fibers, the groove including a first groove part for containing an optical fiber introduced from an outside of the substrate and a second groove part for containing an amplifying optical fiber led out to the outside of the substrate;
recesses formed in the surface for respectively containing an optical coupler which is coupled to optical fibers including one of the amplifying optical fibers; and
a plurality of grooves formed in the surface for containing optical fibers for excitation light introduced from the outside of the substrate and connected to a respective recess and having a width corresponding to a width of a single optical fiber.

2. The cassette according to claim 1, wherein the substrate is a cooling substrate.

3. The cassette according to claim 1, wherein the substrate comes into contact with a cooling substrate and is cooled via the cooling substrate.

4. The cassette according to claim 1, wherein the groove for containing the amplifying optical fibers has a twofold or a multifold spiral configuration.

5. An optical fiber amplifier for amplifying light irradiated from a light source, the optical fiber amplifier comprising:
a cassette according to claim 4 or a plurality of cassettes according to claim 4 provided in a stacked manner, wherein the cassette or plurality of cassettes comprises:
an optical fiber contained in the first groove part introduced from the outside of the substrate for guiding light emitted from the light source;
amplifying optical fibers contained in the groove for containing amplifying optical fibers and in the second groove part for containing an amplifying optical fiber led out to the outside of the substrate;
optical couplers respectively contained in the recesses; and
optical fibers for excitation light contained in the plurality of grooves introduced from the outside of the substrate,
wherein the optical couplers are coupled to the respective optical fibers for excitation light and the respective amplifying optical fibers, and wherein the optical fibers for excitation light are coupled to excitation light sources.

6. The optical fiber amplifier according to claim 5, wherein a diameter of winding of the amplifying optical fibers respectively contained in the groove having a spiral configuration increases as the power of the light that passes through the one or more amplifying optical fibers increases.

7. A light source device, comprising:
a light source;
the optical fiber amplifier according to claim 5 that amplifies light irradiated from the light source; and
a wavelength conversion section that converts a wavelength of the amplified light into a predetermined wavelength.

8. A light source device, comprising:
a light source;
the optical fiber amplifier according to claim 6 that amplifies light irradiated from the light source; and
a wavelength conversion section that converts a wavelength of the amplified light into a predetermined wavelength.

9. An optical fiber amplifier for amplifying light irradiated from a light source, the optical fiber amplifier comprising:
a cassette according to claim 1 or a plurality of cassettes according to claim 1 provided in a stacked manner, wherein the cassette or plurality of cassettes comprise:
an optical fiber contained in the first groove part introduced from the outside of the substrate for guiding light emitted from the light source;
amplifying optical fibers contained in the groove for containing amplifying optical fibers and in the second groove part for containing an amplifying optical fiber led out to the outside of the substrate;

optical couplers respectively contained in the recesses; and optical fibers for excitation light contained in the plurality of grooves introduced from the outside of the substrate, wherein the optical couplers are coupled to the respective optical fibers for excitation light and the respective amplifying optical fibers, and wherein the optical fibers for excitation light are coupled to excitation light sources.

10. An optical fiber amplifier for amplifying light irradiated from a light source, the optical fiber amplifier comprising:

a cassette according to claim 2 or a plurality of cassettes according to claim 2 provided in a stacked manner, wherein the cassette or plurality of cassettes comprise:

an optical fiber contained in the first groove part introduced from the outside of the substrate for guiding light emitted from the light source;

amplifying optical fibers contained in the groove for containing amplifying optical fibers and in the second groove part for containing an amplifying optical fiber led out to the outside of the substrate;

optical couplers respectively contained in the recesses; and optical fibers for excitation light contained in the plurality of grooves introduced from the outside of the substrate, wherein the optical couplers are coupled to the respective optical fibers for excitation light and the respective amplifying optical fibers, and wherein the optical fibers for excitation light are coupled to excitation light sources.

11. An optical fiber amplifier for amplifying light irradiated from a light source, the optical fiber amplifier comprising:

a cassette according to claim 3 or a plurality of cassettes according to claim 3 provided in a stacked manner, wherein the cassette or plurality of cassettes comprise:

an optical fiber contained in the first groove part introduced from the outside of the substrate for guiding light emitted from the light source;

amplifying optical fibers contained in the groove for containing amplifying optical fibers and in the second groove part for containing an amplifying optical fiber led out to the outside of the substrate;

optical couplers respectively contained in the recesses; and optical fibers for excitation light contained in the plurality of grooves introduced from the outside of the substrate, wherein the optical couplers are coupled to the respective optical fibers for excitation light and the respective amplifying optical fibers, and wherein the optical fibers for excitation light are coupled to excitation light sources.

12. The cassette according to claim 1, wherein the groove has a first depth and the plurality of grooves has a second depth, the first depth being deeper than the second depth.

13. The cassette according to claim 1, wherein the groove intersects with the plurality of grooves.

14. The cassette according to claim 1, wherein the optical coupler is coupled to one of the amplifying optical fibers and one of the optical fibers for excitation light.

* * * * *